O. C. GREEN.
Corn Planter.
No. 201,521. Patented March 19, 1878.
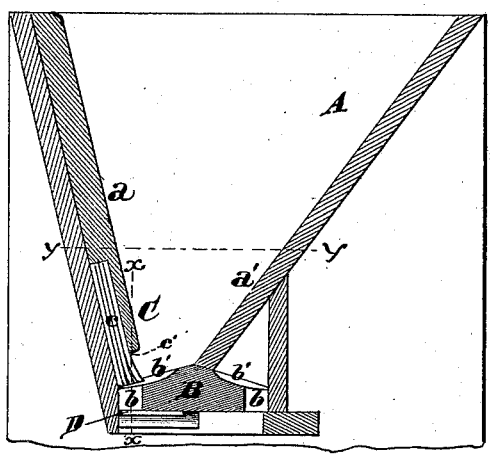
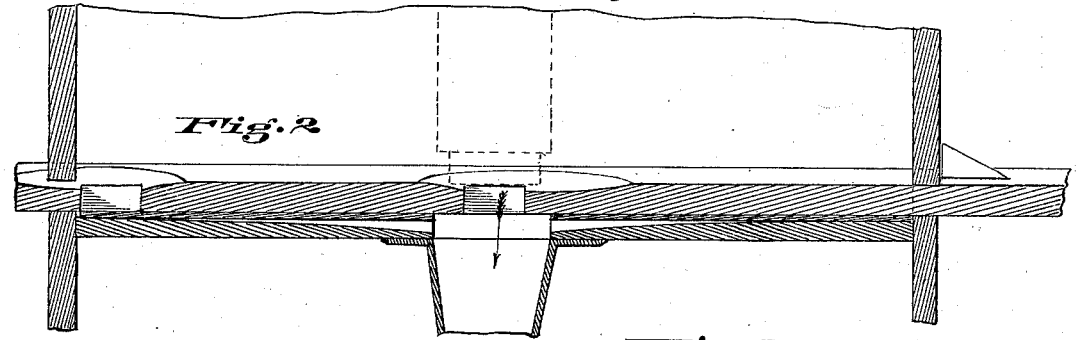
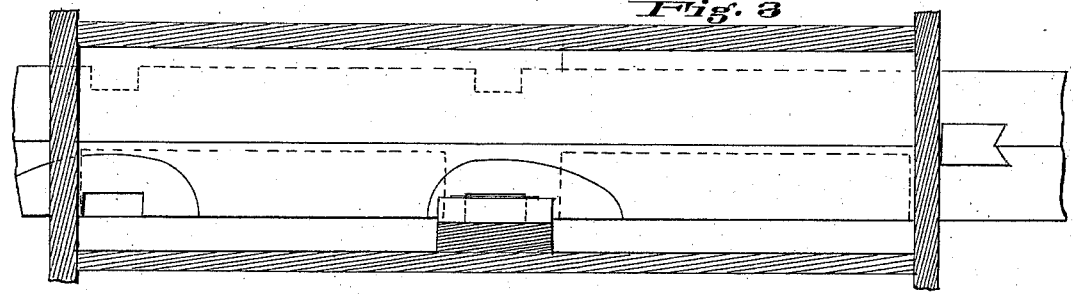
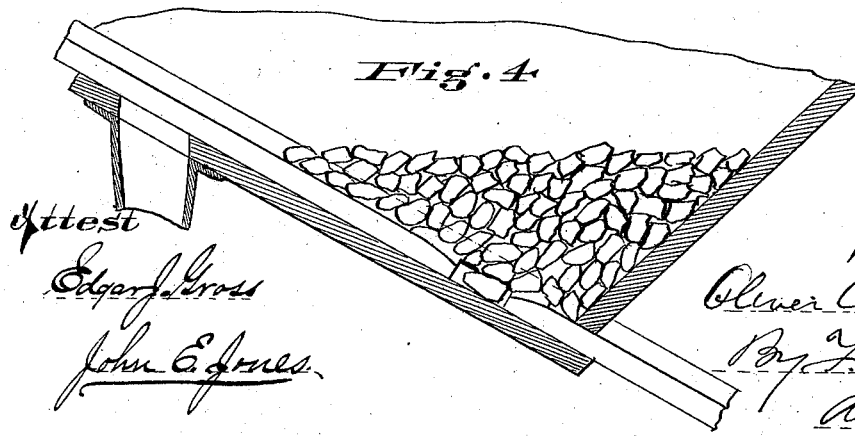
Attest
Edgar J. Gross
John E. Jones
Inventor
Oliver C. Green
By F. Millward
Attorney

UNITED STATES PATENT OFFICE.

OLIVER C. GREEN, OF DUBLIN, ASSIGNOR TO THE HOOSIER DRILL COMPANY, OF MILTON, INDIANA.

IMPROVEMENT IN CORN-PLANTERS.

Specification forming part of Letters Patent No. 201,521, dated March 19, 1878; application filed April 28, 1877.

*To all whom it may concern:*

Be it known that I, OLIVER C. GREEN, of Dublin, Wayne county, State of Indiana, have invented an Improvement in Corn-Planters, of which the following is a specification:

My invention relates to the class of corn-planters in which the seed is dropped from a hopper by means of a reciprocating seed-slide, my object being to enable the seed to be dropped one grain at a time edgewise, with unerring accuracy.

My invention consists, first, in forming the slide with recesses at the seed-cavities, by which the entrance of the seed into the notch or notches in the slide is greatly facilitated; second, in forming the slide with seed cavity or cavities on both its edges with different-sized cavities, by which it is rendered reversible, so that the same slide is adapted to drop different-sized kernels of corn on being reversed to bring a new notch or set of notches into play; third, in forming the seed-slide with an angular upper face, to match the converging hopper and guide the grain in filling; fourth, in the provision, in connection with the cut-off which prevents any grain from entering the seed-tube except the one in the notches, of a spring or springs under the slide, which gives way and enables the seed which rests on it to descend when two grains crowd under the cut-off, and causes the cut-off to expel the extra one without breaking the grain, and thus effect the discharge only of the one first received into the notch.

In the accompanying drawing, Figure 1 is a cross-section of a seed box and slide embodying my invention. Fig. 2 is a longitudinal section of the same through the center of the seed-cavities. Fig. 3 is a plan; and Fig. 4 is a modification in longitudinal section, showing the slide and box arranged to drop one grain for each double stroke.

A is the seed-box, and B the slide. The slide can be operated by a pitman connected with a crank on a shaft operated from the driving wheel or wheels of the machine, or in any other of the well-known ways for operating reciprocating seed-slides. The slide in the drawings is shown double, so as to be reversible, as will be hereinafter explained; but the operative part in either of its positions is from the center to the edge, and this part is inclined from the horizontal, as shown, so that when the slide is not to be reversed it is thicker on one edge than the other, and, when reversible, thicker in the middle than on the edges. The difference in thickness, however, is only necessary when the slide is horizontal at the bottom.

The slide may be of equal thickness, and inclined so that its upper face presents an inclined face, as shown. This inclined upper face, whether obtained by beveling the slide or by inclining it, is an important feature, as it leads the seed properly to the seed-cavities. This inclined face is a continuation, as it were, of the inclined side $a'$ of the hopper, the other side, $a$, being the dropping side.

The edge of the slide at its junction with the side $a$ is notched at one or more places, $b$, as shown. It is usual to make two notches, so that the slide may drop a single seed at the termination of each stroke, as shown. These notches $b$ are cut so that the seed as it falls down the converging sides of the hopper drops edgewise into the notch, when the slide is drawn from under the cut-off, so as to expose the notch.

C is the cut-off. It may be of any preferred construction; but I prefer to make it by inserting a piece of rubber, $c$, in the socket $c'$. It serves, like all other cut-off devices, to prevent the seed in the hopper from directly entering the discharging-tube when the notch is over said tube.

I make notches $b$ in both edges of the slide of different sizes, so that it can drop different-sized kernels of corn by reversing the slide. Under the slide I place two flat springs, D, when the slide feeds from both directions. These springs receive the bottom ends of the seed, and when, as rarely happens, two seeds occupy a single notch, and these seeds catch the edge of the cut-off, the spring descends by reason of the pressure of the kernel on it, and the grain is thus prevented from being cracked by jamming, and the cut-off is enabled to throw off the top grain before the notch reaches the discharge-tube, and let the other fall. At the places where the seed-notches are formed I form the top side of the slide with recesses or cups b', as shown, for the purpose of collecting the seed and enabling it to gather it properly for entrance into the notch.

The cut-off may be dispensed with when the box and slide are inclined, as in Fig. 4, as in that case the seed is collected at the lower part of the box, and the slide picks out a single kernel and carries it up, so as to completely separate it from the bulk of the seed before it is dropped.

I confine myself to a reciprocating seed-dropper plate—that is, a dropper-plate which, by reason of its moving back and forth, is subjected to jerks both at the beginning and termination of a movement. These periodical jerks are an important element both in charging the seed-cavity and in discharging the kernel therefrom.

I claim—

1. The slide B, having notches b and recesses or cups b', substantially as and for the purpose specified.

2. In combination with the hopper A, the seed-slide B, having a double incline on its upper face and notches in both its edges, substantially as and for the purpose specified.

3. In combination with the hopper A and cut-off C, the notched slide B and spring or springs D, substantially as and for the purpose specified.

In testimony of which invention I hereunto set my hand.

OLIVER C. GREEN.

Witnesses:
 WM. H. VORE,
 A. O. MITCHELL.